Nov. 6, 1923.  
A. DAWLEY  
1,473,019  
COMBINED CHICKEN COOP AND TRAP  
Filed March 24, 1923 2 Sheets-Sheet 1

Inventor:
Arthur Dawley,
by Charles C. Sherry
his Atty.

Nov. 6, 1923. 1,473,019
A. DAWLEY
COMBINED CHICKEN COOP AND TRAP
Filed March 24, 1923 2 Sheets-Sheet 2
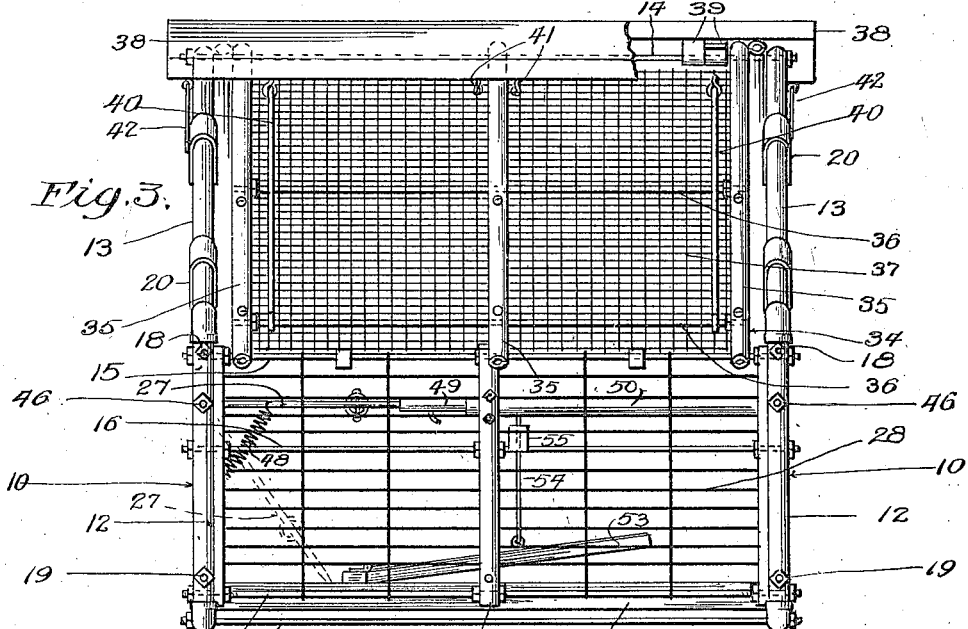
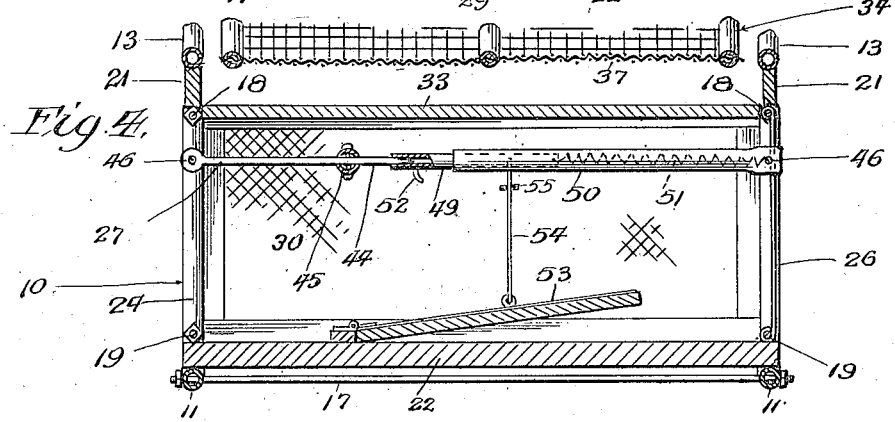
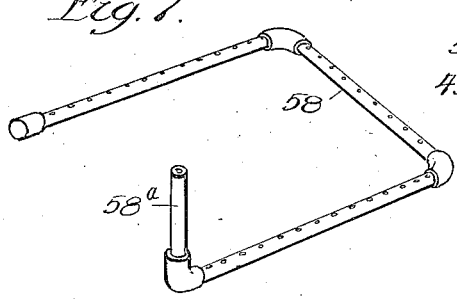
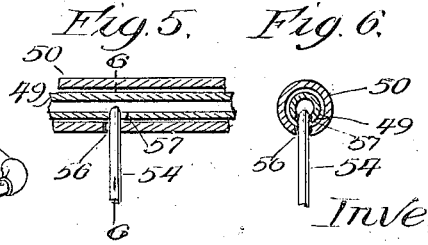
Inventor:
Arthur Dawley,
by Charles O. Shurvey
his Atty.

Patented Nov. 6, 1923.

1,473,019

UNITED STATES PATENT OFFICE.

ARTHUR DAWLEY, OF ATTICA, INDIANA, ASSIGNOR TO HIMSELF AND C. D. PIERCE, COPARTNERS, DOING BUSINESS AS ARTHUR DAWLEY, C. D. PIERCE AND CO., OF ATTICA, INDIANA.

COMBINED CHICKEN COOP AND TRAP.

Application filed March 24, 1923. Serial No. 627,352.

*To all whom it may concern:*

Be it known that I, ARTHUR DAWLEY, a citizen of the United States, and a resident of Attica, Fountain County, Indiana, have invented certain new and useful Improvements in Combined Chicken Coop and Trap, of which the following is declared to be a full, clear, and exact description.

This invention relates to combined chicken coops and traps, and its principal object is to provide, in a single structure, a compartment for housing chicks or small chickens, and one or more animal traps, the chicks or chickens serving as live bait for luring vermin into the trap, and the chicks or chickens being safely housed against injury from the vermin. Another object is to provide a structure having a roof, which may be raised to let in air and sunshine, and which may be lowered to protect the chicks or chickens against rain. Another object is to provide novel means for actuating the trap doors of the traps. Another object is to provide means for containing an insect exterminating fluid, and having perforations through which the vapors from said fluid may escape into the coop.

With these and other objects in view, this invention consists in the several novel features hereinafter fully set forth and claimed.

Figure 1:
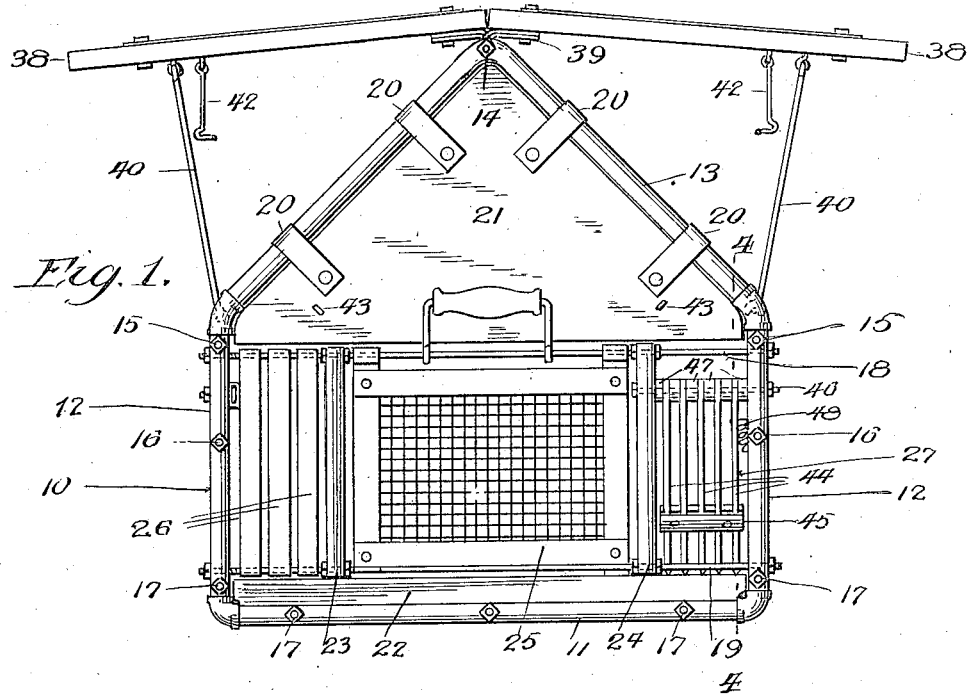
Figure 2:
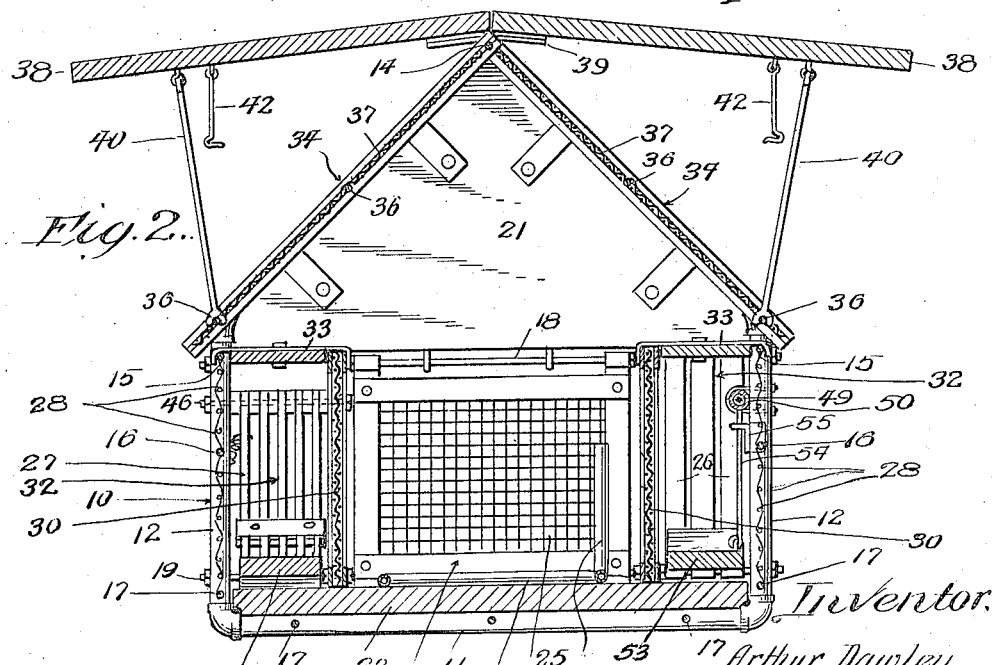

The invention is clearly illustrated in the accompanying drawings, in which:

Fig. 1 is an end elevation of a combined chicken coop and trap, embodying a simple form of the present invention and showing the trap door closed; Fig. 2 is a vertical cross section of the device; Fig. 3 is a side elevation of the device with the trap door raised; Fig. 4 is a vertical longitudinal section taken on the line 4—4 of Fig. 1; Fig. 5 is a detail, fragmental, longitudinal section through a certain trap door setting device; Fig. 6 is a vertical cross section taken on the line 6—6 of Fig. 5, and Fig. 7 is a perspective view of the fluid containing pipe.

Referring to said drawings, which illustrate one embodiment of the invention, the reference characters 10, 10 designate two similar end frames, preferably made of pipe or tubing and pipe fittings which connect the pipes of each frame. Each frame comprises a bottom piece 11, upright corner members 12 and a V or angle shaped roof frame member 13. The two end frames are connected by horizontal, lengthwise extending tie rods 14, 15, 16, 17, provided with nuts, threaded thereon and bearing against the end frames. Horizontal, cross wise extending tie rods 18, 19 connect the upright or corner members 12 of each frame at the upper and lower ends thereof, and said tie rods have nuts threaded thereon that bear against said upright members 12.

Secured to both roof frame members 13 by pieces of strap iron 20, are the front and back gable portions 21, which occupy the triangular spaces between the peak of the roof members and the place where the upright or corner members 12 join said roof members 13. A floor 22 is secured to the bottom frame members 11. At suitably spaced places on the tie rods 18, 19 are secured upright intermediate frame members 23, 24 which are held in place on said rods by nuts which are threaded on the rods 18, 19, one nut being on each side of each frame member 18, 19. Between the frame members 23, 24 at each end, is a door 25 hingedly supported on the rod 18, and capable of being opened for access to the interior of the structure. Said doors are held in place by latches or otherwise as desired. At one side of each door 25 is a doorway or opening arranged to be closed by a trap door 27, as will be hereinafter set forth more in detail.

The sides 28 of the structure may be formed of wire or rods as desired, which are secured to and extend between the corner frame members 12 and between the tie rods 15, 17. Intermediate upright frame members 29 may be provided midway between the corner members 12 for strengthening the sides thereof. Extending from end to end of the structure, between the frame members 23, 24 are open work partitions 30, 30 which are secured to said frame members 23, 24, and divide the structure into a central compartment 31, for the chicks or chickens, and two compartments 32, 32, that comprise the animal traps. Each compartment 32 is covered by a top or roof 33 secured to the partition, and walls. Open work top portions or covers 34, 34 are hingedly secured upon the tie rod 14 at the peak of the roof and complete the enclosure for the coop. Said top portions or covers 34 may comprise bars 35 connected by tie rods 36 and wire mesh work 37, secured to said bars 35. The top portions 34 may be secured to the side walls by latches or otherwise, as is desired. They may be raised for access to the interior of the chicken coop.

Above the top portion is the roof, which comprises two roof portions 38, 38, hingedly secured upon the tie rod 14 by hinges 39. Struts 40 secured to the roof portions 38 and having forked lower ends, are employed for holding the roof portions in raised position, the forks of said struts being adapted to straddle and rest on the tie rods 36 of the top portions 34. The struts 40 may be detached from the tie rods 36 and moved up against the underside of the roof portions where they may be held by hooks 41. Hooks and eyes 42, 43 on the roof portions 38, and gable portions 21, respectively, provide means for securing the roof portions down upon the top of the structure. The roof portions may be raised and held in raised position by the struts to ventilate the chicken coop.

The trap doors 27 are similar in construction and each is preferably formed of parallel wires or rods 44, connected near their free ends by bars 45, to which they are secured. They are pivotally mounted upon a threaded rod 46 that extends across the door opening and is secured to the frame members 24, 12 by nuts, as shown. Spacing washers 47 space the rods apart at the ends, which are pivoted upon the rod 46. A coiled tension spring 48 secured to the door and to the frame member 12, acts to close the door when released from the setting and releasing mechanism. As shown, said mechanism comprises a hollow rod 49 slidably mounted in a tube 50, secured to the frame work of the device, substantially in line with the door when raised into open position. The hollow rod 49 is arranged to be drawn forward in its supporting tube, and slipped over one of the wires or rods of the door, to thereby hold said door in open position, and a coiled tension spring 51 which is contained in the tube 50, is secured to said hollow rod 49 and to some stationary part at the end of the supporting tube. Said spring acts to retract the rod 49 from the door 27 and a stop member 52 on the rod 49 limits the movement of said rod into the tube, so as to leave a part projecting which may be taken hold of in resetting the trap. A treadle 53 hinged to the floor of the trap, is provided, which has a trigger pin 54 connected to it, that extends up through a guide bracket 55, and is adapted to enter holes 56, 57 in the tube 50, and hollow rod 49 when they register, and thereby hold the rod 49 in engagement with the door and against the action of the spring. The holes 56, 57 register when the hollow rod is pulled forward into engagement with the door, and after the trigger pin is inserted into said holes 56, 57, the spring 51 draws the edge of the hole 57 of the hollow rod into engagement with the trigger pin, bringing the pin into engagement with the edge of the hole 56 in the tube and frictionally holds the pin in raised position with the treadle raised. Whenever an animal enters the trap portion and depresses the treadle, the trigger pin is drawn down out of the holes 56, 57 and the spring 51 retracts the hollow rod 49, releasing the door 27 and permitting it to close and confine the trapped animal.

On the floor 22 of the chicken compartment 31 is a perforated fluid containing pipe 58, made up of pipe sections connected by pipe fittings, as shown in Fig. 7, and having an upstanding pipe 58$^a$ through which fluid may be poured into the perforated pipe. An insect exterminating fluid is used in the pipe, which vaporizes and escapes from the perforations thereof and enters the chicken compartment.

From the above it is to be observed that chickens can be housed in the chicken compartment free from danger from vermin that usually destroy chickens, and that the chickens act as live bait for the traps to lure vermin into said traps.

More or less variation of the exact details of construction is possible without departing from the spirit of this invention; I desire, therefore, not to limit myself to the exact form of the construction shown and described, but intend, in the following claims, to point out all of the invention disclosed herein.

I claim as new and desire to secure by Letters Patent:

1. In a trap structure, an animal compartment, having a door opening leading thereto, a swinging trap door for closing said opening, pivotally mounted on said structure, a spring actuated endwise movable door holding rod arranged to engage with said door to hold it in open position, a tube in which said rod is slidably guided, a trap springing treadle and a trigger pin connected to said treadle, and arranged, when in raised position, to enter registering holes in said tube and rod and engage with said door holding rod to thereby hold said rod in engagement with said door, but arranged to release said rod when the treadle is depressed.

2. In a trap structure, an animal compartment, having a door opening leading thereto, a spring actuated, trap door formed of connected rods for closing said opening and pivotally mounted on said structure, an endwise movable hollow rod, one end of which is adapted to be slipped over one of the rods of said door to hold it in open position, a tube in which said rod is slidably mounted, a coiled spring for retracting said rod from the door, a treadle and a trigger pin connected to said treadle and arranged, when raised, to enter registering holes in said rod and tube, to thereby hold said rod in engagement with said door, but capable of releasing said rod, when the treadle is depressed.

3. In a combined chicken coop and trap, two spaced, end frames formed of jointed pipes, the tops of said frames being of gable formation, solid, front and back gable portions secured to said frames, tie rods connecting said frames, a floor, open work sides, and a top secured to said frames, two solid roof portions hinged to the top of the structure and capable of being raised, two stationary partitions dividing said structure into a central chicken compartment and two animal trap compartments, trap doors and trap door actuating mechanism for said animal trap compartments.

ARTHUR DAWLEY.